J. DI SALVO.
EXPANSION DEVICE.
APPLICATION FILED OCT. 2, 1916.

1,224,720.  Patented May 1, 1917.

Witness:
Harry S. Gaither

Inventor:
Joseph Di Salvo
by Banning & Banning
Attys

UNITED STATES PATENT OFFICE.

JOSEPH DI SALVO, OF JOLIET, ILLINOIS.

EXPANSION DEVICE.

1,224,720.  Specification of Letters Patent.  Patented May 1, 1917.

Application filed October 2, 1916. Serial No. 123,399.

*To all whom it may concern:*

Be it known that I, JOSEPH DI SALVO, a citizen of the United States, residing at Joliet, in the county of Will and State of Illinois, have invented certain new and useful Improvements in Expansion Devices, of which the following is a specification.

The present invention has to do with improvements in expansion devices and has particular reference to the construction of the expansion nut and its method of manufacture.

The main object of the present invention is to provide an expansion nut which shall be of integral construction throughout, and which may be made by a stamping operation, as distinguished from a casting operation. Other objects and features of the invention will appear from a detailed description of the same, which consists in the features of construction and combinations of parts hereinafter described and claimed.

Referring to the drawing.

Figure 1:
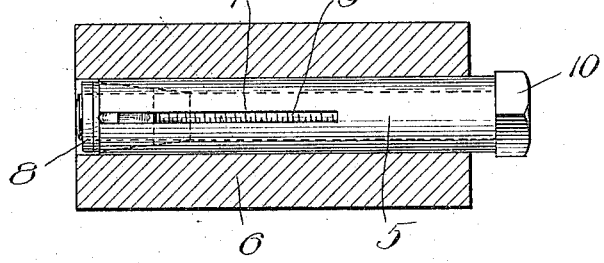
Figure 1 shows a simple form of application of the expansion nut to which the present invention relates.

In the drawing I have shown a nut embodying the features of my invention as applied to the expansion of a split sleeve, which split sleeve is seated within a socket or recess of another article. However, it will be manifest that the nut may be used in connection with the expansion of many other devices than split sleeves.

In the application of the invention shown in Fig. 1 the split sleeve is designated by the numeral 5. The said split sleeve is seated within a recess or opening of a member 6. The end portion of the sleeve is split as at 7, and the spreading or expanding of the sleeve is accomplished by the nut 8, which nut embodies the features of the present invention. A bolt 9 having the head 10 is threaded into the expansion nut 8, so that upon rotating the bolt the nut will be drawn into the split sleeve and expand the same.

Figure 2:
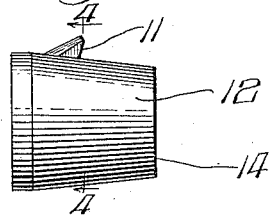
Fig. 2 shows a side elevation of the expansion nut.
Figure 3:
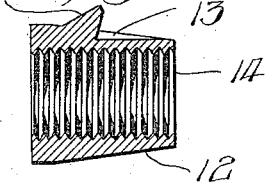
Fig. 3 shows a longitudinal section of the nut.
Figure 4:
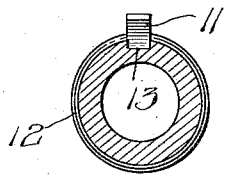
Fig. 4 shows a cross-section taken on the line 4—4 of Fig. 2, looking in the direction of the arrows.

As shown particularly in Figs. 2, 3 and 4, the outer surface of the nut is circular in cross-section and is tapered in the direction of its axis, so that when it is drawn into the split sleeve an expanding action will be secured.

Means should be provided for preventing the rotation of the nut within the sleeve, so that the bolt 9 will properly thread through the nut. Ordinarily, the nut is provided with a separate pin which is set into a recess in its side portion, the said pin engaging the slot of the split sleeve. This arrangement presents a serious objection in this, that it necessitates a considerable amount of additional labor in the manufacture of the nut. Another very serious objection is that where a separate pin is set into the nut the amount of material in the body of the nut must be very largely increased over what would otherwise be necessary, because the wall of the nut must be thick enough to give a sufficient and substantial bearing or holding surface for the pin. Such thickness of the nut is far greater than is actually necessary for the purpose of giving sufficient mechanical strength to the nut; and, consequently, such additional material is an absolute waste necessitated simply by reason of the insertion of a pin which is separate and distinct from the body of the nut.

In order to overcome these various objections to the use of a separate pin, I have provided the construction shown in detail in Figs. 2, 3 and 4. In this case the use of a separate pin is dispensed with and a tongue 11 is struck out from the body of the material of the nut, which tongue engages the slot of the split sleeve and retains the nut against rotation. The tongue is conveniently formed in the following manner: The nut is first finished on its outer surface 12 to the desired form and size. Thereupon, a die tool, such as a cold chisel, is driven axially with respect to the nut so as to form a recess 13 and drive the material removed from said recess axially, thereby forming the tongue. By this operation the tongue is struck out from the body of the nut, and the volume of material contained in the projecting portion of the tongue is substantially, if not identically, equal to the volume of the recess or socket 13. Consequently, the total weight of the nut remains unchanged as a result of this operation.

By performing the die operation just described, commencing at the small end of the nut and advancing toward the larger end thereof, the die traveling parallel to the axis of the nut, it will be evident that a relatively large amount of material may be driven out to form the tongue, notwithstanding the fact that the nut at the end 14 is formed of material hardly thicker than is absolutely necessary for the accommodation of the interior threads. It is thus evident that the tongue may be formed in a nut containing a minimum amount of material. Furthermore, the nut may be made of malleable material or soft steel, so as to possess a very great amount of strength.

While I have herein shown and described only a single embodiment of the features of my invention, still it will be understood that I do not limit myself to the said embodiment except as I may do so in the claims.

I claim:

1. As a new article of manufacture, an expansion nut comprising an integral circular piece of material threaded on its inner surface and having its outer surface formed substantially as a truncated cone, there being a recess in the outer surface of said nut, the floor of said recess being substantially parallel to the axis of the nut, and an integral tongue projecting from the outer surface of the nut commencing at the deep end of said recess, said tongue having a volume of material substantially equal to the volume of the recess, substantially as and for the purpose set forth.

2. As a new article of manufacture, an expansion nut comprising a single piece of material having its outer surface formed as a truncated cone and having its inner surface threaded, there being a recess in the outer surface of the nut, the floor of said recess being substantially parallel to the axis of the nut, and an integral tongue projecting from the outer surface of the nut at a point adjacent to the deep end of the recess, substantially as and for the purpose set forth.

3. As a new article of manufacture, an expansion nut comprising a single piece of material having its outer surface of substantially circular cross section, there being a recess in said outer surface, the floor of said recess lying substantially parallel to the axis of the nut, and an integral tongue projecting from the outer surface of the nut at one end of said recess, said tongue having a volume substantially equal to the volume of the recess, substantially as and for the purpose set forth.

JOSEPH DI SALVO.

Copies of this patent may be obtained for five cents each, by addressing the "Commissioner of Patents Washington, D. C."